Aug. 8, 1950     C. C. STUART     2,517,940
VEHICLE SPRING AND AXLE ASSEMBLY
Filed Oct. 3, 1945     3 Sheets-Sheet 1
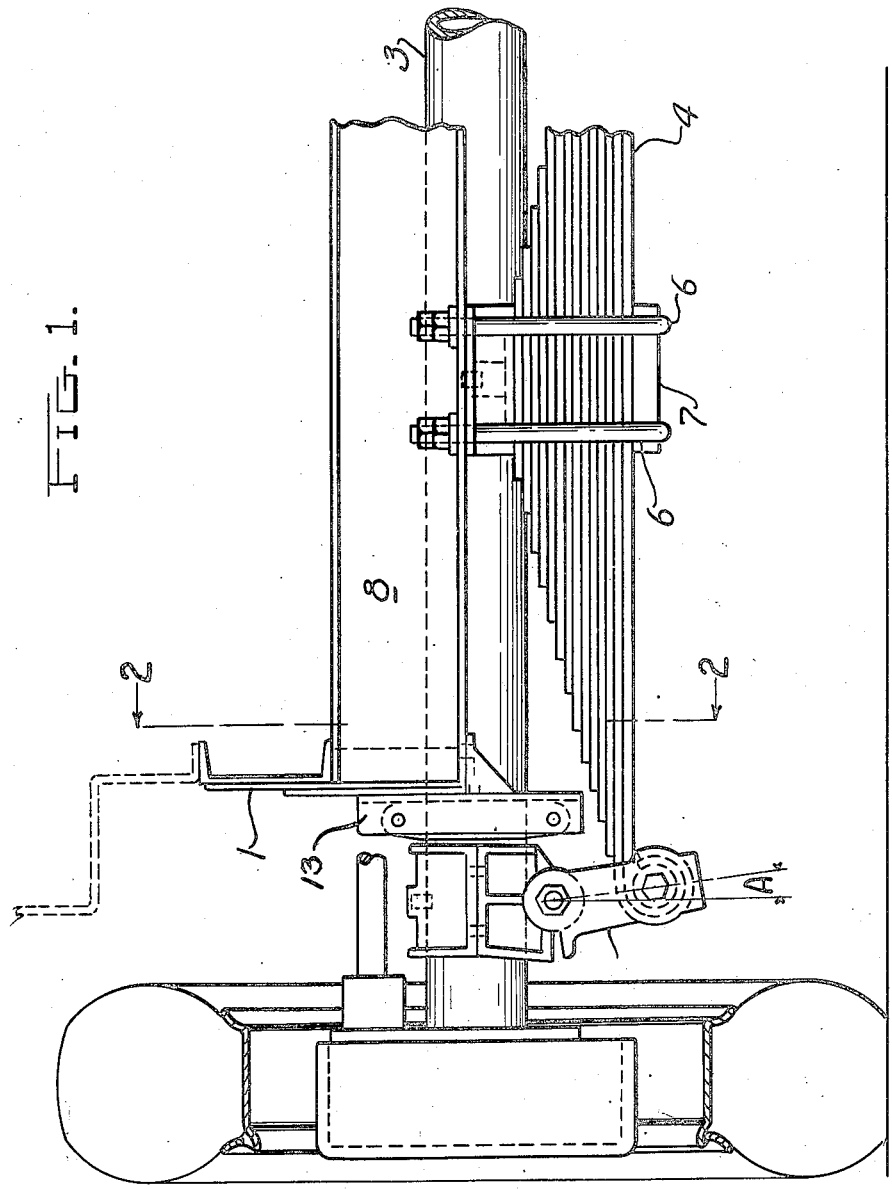
INVENTOR
*Clarence C. Stuart*
BY
ATTORNEYS.

Aug. 8, 1950 C. C. STUART 2,517,940
VEHICLE SPRING AND AXLE ASSEMBLY
Filed Oct. 3, 1945 3 Sheets-Sheet 2
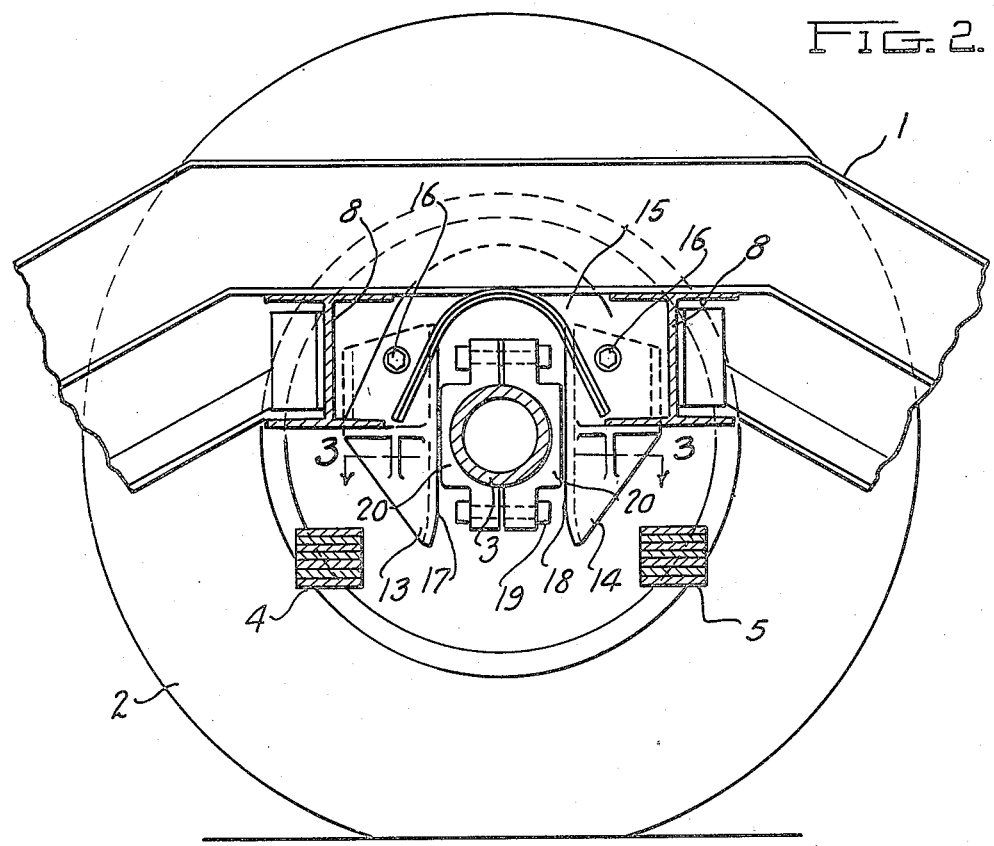
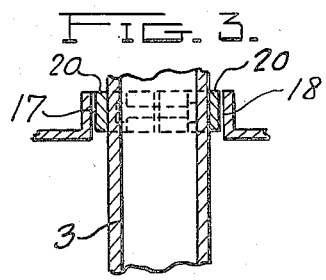
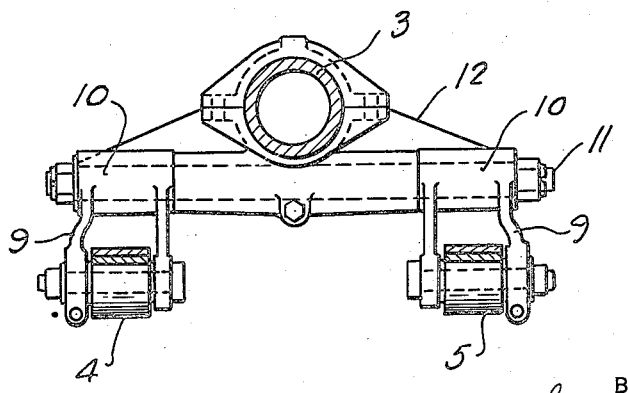
INVENTOR
*Clarence C. Stuart*
BY
*Barnes, Kisselle, Laughlin & Raisch*
ATTORNEYS.

Aug. 8, 1950      C. C. STUART      2,517,940
VEHICLE SPRING AND AXLE ASSEMBLY
Filed Oct. 3, 1945      3 Sheets-Sheet 3
FIG. 5.
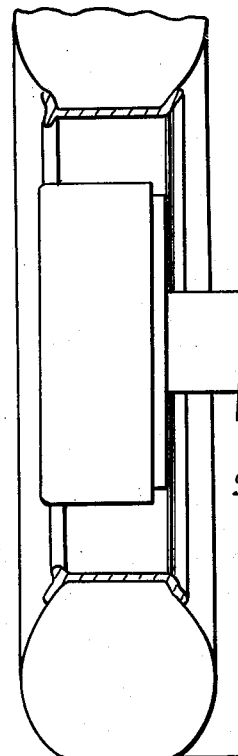
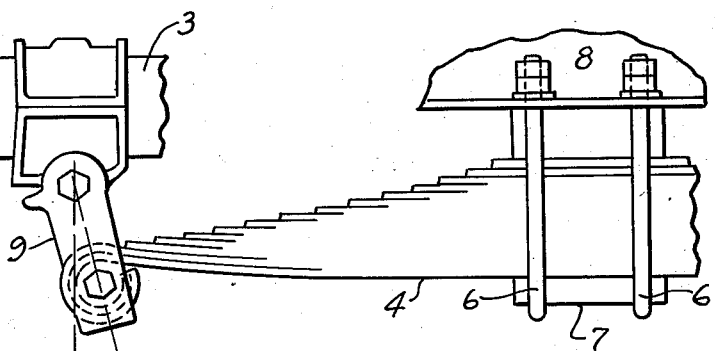
FIG. 6.
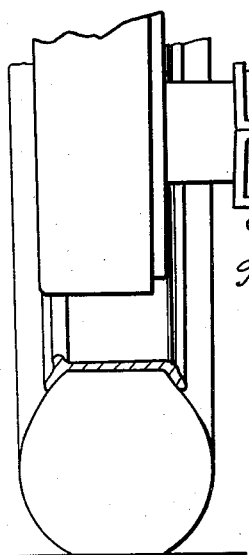
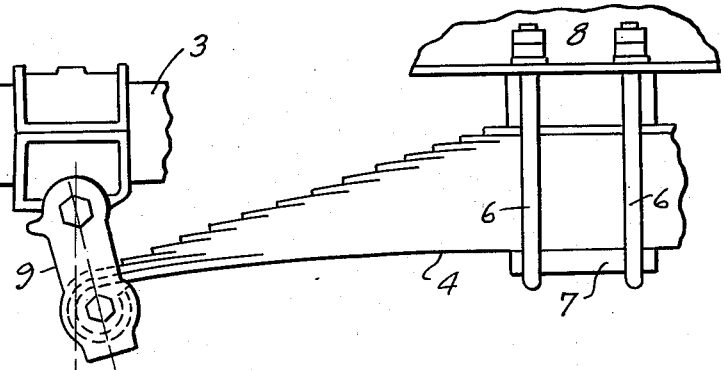
INVENTOR
Clarence C. Stuart
Barnes, Kisselle, Laughlin & Raisch
BY      ATTORNEYS Patented Aug. 8, 1950

2,517,940

UNITED STATES PATENT OFFICE 2,517,940

VEHICLE SPRING AND AXLE ASSEMBLY

Clarence C. Stuart, Dearborn, Mich., assignor to Traffic Transport Engineering, Inc., Dearborn, Mich., a corporation of Michigan Application October 3, 1945, Serial No. 620,085

5 Claims. (Cl. 267—38)

This invention relates to a vehicle spring and axle assembly and more particularly to a transverse spring and axle assembly.

It is an object of this invention to produce a spring and axle assembly for a vehicle which is of simple structure and dependable and efficient in operation.

Fig. 1 is a fragmentary rear elevation showing my spring and axle assembly.

Fig. 2 is a section along the line 2—2 of Fig. 1.

Fig. 3 is a horizontal section along the line 3—3 of Fig. 2.

Fig. 4 is a detail showing the spring shackle connection with the axle housing.

Figs. 5 and 6 are views similar to Fig. 1 but showing the transverse springs in overloaded and in underloaded position respectively.

Referring more particularly to the drawings I have shown my invention as applied to an automotive vehicle comprising a frame or chassis 1, wheels 2, axle 3, transverse sectional springs 4 and 5 positioned respectively on the front and rear sides of axle 3. Each sectional transverse leaf spring 4 and 5 is secured at its mid-section to a transverse frame member 8 by U bolts 6 and plate 7. Transverse frame members 8 are fixed to the chassis frame 1 by welding, riveting or other convenient means. Transverse springs 4 and 5 are pivotally supported at each end to shackles 9 which are pivoted as at 10 on shaft 11 carried by bracket 12 which is fixed on axle 3. The pivotal supporting of springs 4 and 5 at each end upon axle 3 by shackles 9 permits the leaf springs to elongate under load and shorten when relieved of load without buckling in the well known manner.

My invention particularly contemplates a novel arrangement for preventing the transfer of any torque to transverse springs 4 and 5. This object is accomplished by securing a pair of guide plates 13 and 14 upon cross frame members 8. Guide plate 13 is positioned in back of axle 3 and guide plate 14 in front of axle 3. Guide plates 13 and 14 can be welded or otherwise affixed to cross frame members 8 and a U shaped reinforcing bracket 15 is secured by bolts 16 to the upper ends of guides 13 and 14. Guide plates 13 and 14 are provided with hardened parallel and vertical guide surfaces 17 and 18. A pair of guide plates 13 and 14 are positioned at each side of axle 3 preferably below and adjacent each side of frame member 1. Axle 3 has secured thereto by bolts 19 shoe members 20 which, like surfaces 18 and 19, are made of a hard wear resisting metal. Shoes 20 slide upwardly and downwardly on surfaces 17 and 18 and thus transfer any torque from axle 3 to plates 13 and 14 and their supporting frame members 8 and prevent any of the driving or braking torque from being transferred to springs 4 and 5. Shoes 20 have a snug sliding fit with surfaces 17 and 18 and in the guideway formed by guide surfaces 17 and 18. Thus, shoes 20 are free to slide upwardly and downwardly in guides 17 and 18 but cannot turn therein. As stated above, shoes 20 are tightly clamped to axle 3 so that there can be no relative turning or slipping movement between shoes 20 and axle 3.

Since a pair of plates 13 and 14 is mounted on each side of the chassis frame adjacent the side frame members 1 and since axle 3 is provided with a pair of shoes 20 adjacent its opposite ends which cooperate with guide plates 13 and 14, it will be seen that axle 3 will be kept at all times perpendicular to the longitudinal axis of frame 1 and is only free to move upwardly and downwardly with respect to frame 1 in guides 13 and 14. It will be seen that this arrangement obviates the need for the usual radius rods which are used for tying the axles to the frame.

In viewing Figs. 1, 5 and 6, it should be borne in mind that the right half of the spring and shackle assembly is identical with the left half shown in the figures. Shackles 9 at opposite ends of springs 4 and 5, regardless of the load on the springs, never reach vertical position but always incline inwardly toward each other so that angles A, B and C are always greater than zero. In Fig. 1 the springs carry what may be termed a normal load whereas in Figs. 5 and 6 the springs are over and underloaded respectively. This transverse spring arrangement gives, in a sense, independent springing or knee action on the part of each wheel because road shocks are taken up at the flexible ends of the springs and not transmitted to the frame. Further, when the vehicle is rolling around a turn, the load and frame 8 will remain level or horizontal and this prevents the fenders on the outside of the turn from scrubbing against the tires.

I claim:

1. In a vehicle comprising a frame and a transverse axle adapted to be supported on wheels, parallel transverse springs positioned adjacent to and one in front and the other in the rear of said axle for supporting said frame on said axle, means rigidly securing said springs at their mid-section to said frame, shackle means pivotally connecting the ends of said springs to the axle, a pair of vertical guide members fixed to said frame adjacent each side of said frame, one guide member of each pair being positioned in front of said axle and the other guide member in back of said axle, said guide members cooperating to form a substantially vertical guideway having substantially flat front and back guide surfaces, a slide for each guideway fixed to said axle, said slide having substantially flat front and rear slide faces in coplanar contact with the front and rear guide surfaces whereby the axle is permitted to shift transversely of said frame within said guides and is guided in its vertical movement relative to said frame and axle torque is transmitted to said frame and not to said springs.

2. In a vehicle comprising a frame and a transverse axle adapted to be supported on wheels, parallel transverse springs positioned adjacent to and one in front and the other in the rear of said axle for supporting said frame on said axle, means rigidly securing said springs at their midsection to said frame, shackle means pivotally connecting the ends of said springs to the axle, said shackle means being constructed and arranged so that under all load conditions said shackle means at the opposite ends of said springs will be inclined downwardly and inwardly toward each other, a pair of vertical guide members having substantially flat guide surfaces fixed to said frame adjacent each side of said frame, one guide member of each pair being positioned in front of said axle and the other guide member in back of said axle, said guide members cooperating to form a substantially vertical guideway, a slide for each guideway fixed to said axle, said slide having substantially flat front and rear slide faces and having a surface contact with the front and rear guide surfaces whereby the axle is restricted in its transverse movement by said shackle means and is guided in its vertical movement relative to said frame by said slides and guides and axle torque is transmitted to said frame and not to said springs.

3. In a vehicle comprising a frame and a transverse axle adapted to be supported on wheels, parallel transverse springs positioned one in front and the other in the rear of said axle for supporting said frame on said axle, means rigidly securing said springs at their mid-section to said frame, shackle means pivotally connecting the ends of said springs to said axle and permitting limited transverse movement of said axle relative to said frame, a plurality of vertical guides positioned on said frame and spaced longitudinally of said axle, said guides having guide surfaces cooperating to form a substantially vertical guideway straddling said axle, a plurality of shoes fixed on said axle and having front and rear slide faces in contact with said guide surfaces, said shoes being unobstructed by said guides in a direction longitudinally of said axle, whereby said axle is guided upwardly and downwardly in a plane substantially perpendicular to said frame.

4. In a vehicle comprising a frame member and a transverse axle member, parallel transverse springs positioned one in front and one in back of said axle for supporting said frame on said axle, shackle means pivotally connecting the ends of said transverse springs to one of said members, means rigidly securing said springs substantially at the mid-section to the other of said members, a pair of vertical guides fixed on one of said members adjacent each side of said frame, one guide member of each pair being positioned in front of the axis of said axle and the other guide in back of the axis of said axle, said guides cooperating to form a substantially vertical guideway therebetween, a slide for each guideway fixed to the other of said members, said slides each having front and rear slide faces slidably engaging said guides, said slides being movable substantially in said guideways in vertical and transverse directions to permit substantial relative vertical and transverse movement of said axle and frame and prevent relative movement of said axle and frame in a direction longitudinally of the frame, said shackles being offset from the transverse path of movement of said slides in said guideways, whereby axle torque is taken up by said frame.

5. In a vehicle comprising a frame member and a transverse axle member, parallel transverse springs positioned one in front and one in back of said axle for supporting said frame on said axle, shackle means pivotally connecting the ends of said transverse springs to one of said members, means rigidly securing said springs substantially at the mid-section to the other of said members, a pair of vertical guides fixed to said frame adjacent each side of said frame, one guide member of each pair being positioned in front of said axle and the other guide member in back of said axle, said guide members cooperating to form a substantially vertical guideway having substantially flat front and back guide surfaces, a slide for each guideway fixed to said axle, said slide having substantially flat front and rear slide faces in coplanar contact with the front and rear guide surfaces, said shackles being offset from the transverse path of movement of said slides in said guideways, whereby the axle is permitted to shift transversely of said frame within said guides and is guided in its vertical movement relative to said frame and axle torque is transmitted to said frame and not to said springs.

CLARENCE C. STUART.

REFERENCES CITED

The following references are of record in the file of this patent:

UNITED STATES PATENTS

| Number | Name | Date |
|---|---|---|
| 204,589 | Ludlow | June 4, 1878 |
| 304,292 | Buckler et al. | Sept. 2, 1884 |
| 770,727 | Madden | Sept. 20, 1904 |
| 1,159,140 | Weber | Nov. 2, 1915 |
| 1,609,946 | Hill | Dec. 7, 1926 |
| 1,615,340 | Mullins | Jan. 25, 1927 |
| 1,909,349 | Hamren | May 16, 1933 |
| 2,088,841 | Dahlinger | Aug. 3, 1937 |